Sept. 17, 1935.  W. P. GENOVAR, JR  2,014,931
COOKING UTENSIL
Filed Sept. 13, 1934

Inventor
William P. Genovar. Jr.
By John J. Thompson
Attorney

Patented Sept. 17, 1935

2,014,931

UNITED STATES PATENT OFFICE 2,014,931

COOKING UTENSIL

William P. Genovar, Jr., Poughkeepsie, N. Y.

Application September 13, 1934, Serial No. 743,815

5 Claims. (Cl. 53—1)

This invention relates to cooking utensils of all classes and more particularly to means for increasing the heating surfaces that are exposed to the flame and burning gases to increase the efficiency of the utensil and to perform the cooking with less fuel consumption.

In the use of the usual cooking utensil which is formed with a smooth bottom and sides, and which when placed over a gas burner will allow of the quick passage of the flame and burning gases over the surface thereof, a great percentage of the heat from the gas is wasted and also increases the time necessary to effect the cooking as it will require longer for the utensil to heat in this manner.

The object of the invention is to provide means whereby through the novel design of the cooking utensil a greater heating surface is provided to absorb heat from the flame of the gas burner, as the amount of heat which is absorbed by a body varies directly as the surface area of the body exposed to the heating medium.

Another object of the invention is to so design the cooking utensil that not only will the surface area be greatly increased, but the same will tend to strengthen the utensil as well.

In carrying out my invention I have designed a cooking utensil, in the form of kettle, pot, pan or other well known shape, to be made either from a casting or sheet metal, and formed with a number of ribs, fins, knobs, etc., on its bottom and sides to greatly increase the surface that is exposed to the heat.

Also I have provided means whereby the heat is prevented from a direct upward passage by the side of the utensil, thus delaying its speed and giving it more time within which to heat the utensil and its contents.

With these and other objects in view, my invention consists in certain new and useful improvements in design and construction of cooking utensils as will hereinafter be fully described and claimed, and further illustrated in the accompanying drawing which forms a part hereof and in which like figures of reference refer to corresponding parts in all of the views, and it is understood that slight changes may be made without departing from the spirit of the invention.

In the drawing:

Figure 1 is a side elevation of a cooking utensil, showing the bottom and sides increased in surface area by the use of ribs or fins cast integral therewith or otherwise attached thereto, the ribs on the bottom being radial in design.

Figure 2 shows a similar cooking utensil, but with the added feature of a bottom annular flange to help retain the heat to the bottom surface and an annular reinforcing ring adjacent the upper ends of the side ribs for the purpose of protecting them; holding back the heat and providing a supporting ring for the utensil should the same be used with a stove having a deep burner opening, or on a coal stove where the cover has been removed and the utensil is inserted through the top to get it nearer the fire.

Figure 5 shows a bottom view where the increased surfaces are in the form of knobs, bosses and the like.

Figure 6 shows a bottom view, where the sides are fluted and the bottom provided with transverse ribs.

Figures 1, 2:
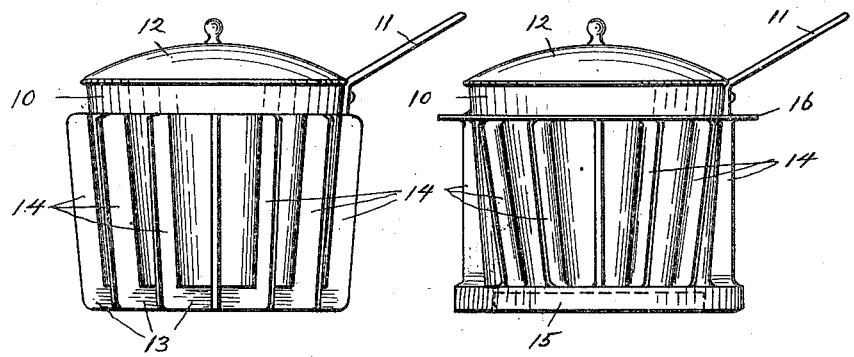

Referring to the drawing:

While it is understood that the invention is applicable to any type or design of cooking utensil either of metal or other material and which may be cast, pressed or molded, I have here shown the same as being embodied in a cast metal cooking pot 10, having a handle 11, and the cover 12.

As shown in Figure 1, the bottom of the utensil or pot 10 is provided with a series of radial ribs 13 of the desired thickness and shape, and from the outer ends of which are extended upward along the sides of the pot 10, the side ribs 14 which are integral therewith and which extend to within a short distance of the upper edge of the pot 10.

Depending upon the side of these ribs 13 and 14, the heating surface of the pot 10 may be greatly increased to several times that of the usual surface area of the standard pot.

In Figure 2, I have shown in addition to the bottom ribs 13 and the side ribs 14, a bottom annular rib 15 which extends from the bottom of the pot 10 and tends to retain the heat to the bottom, and I have also provided an upper annular rib 16 which encircles the pot 10 near the upper edge thereof, being integral with the upper ends of the ribs 14 and forming pockets to retain the heat between the ribs 14 and from escaping upward.

This flange or rib 16 may also be used as a support for the pot when used in connection with a stove lid opening.

Figures 3, 4:
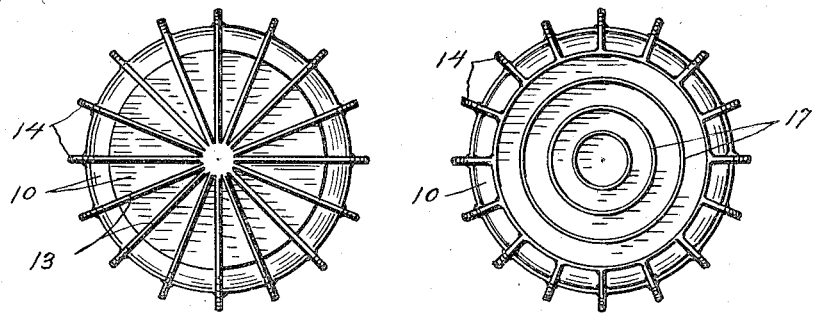
Figure 3 shows a bottom plan view of the utensil shown in Figure 1.
Figure 4 shows a modified form of bottom where the ribs are of concentric form.

As shown in Figure 4, the ribs 17 formed on the bottom of the pot 10 are of the concentric type and tend to retain the heat thereby.

Figures 5, 6:
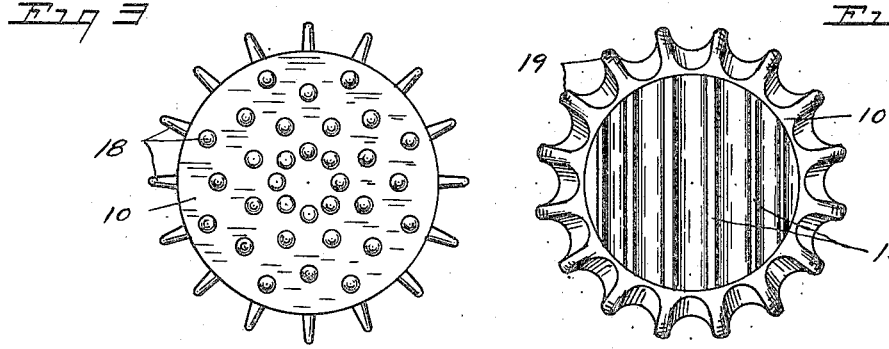

In Figure 5, the increased surfaces are in the form of knobs or spikes 18 formed on the sides and bottom of the pot 10, but this form does not provide as much additional surface area as that of the ribs.

In Figure 6, I have shown the side ribs 19 in the form of flutes and the ribs 13 on the bottom arranged in parallel or transverse design.

Having thus described my invention, what I claim as new and desire to secure by Letters Patent, is:

1. In a cooking utensil of the class described, a series of radial ribs formed on the bottom and extending up the sides and integral therewith.

2. In a cooking utensil of the class described, a series of radial ribs formed on the bottom thereof, a series of radial ribs formed on the sides of said utensil and integral both with the sides and bottom ribs.

3. In a cooking utensil of the class described, an annular flange formed on the bottom thereof and extending downward from the bottom, a series of radial ribs formed on the sides of said utensil and having their lower ends attached to said flange.

4. In a cooking utensil of the class described, the combination with an annular flange formed on the side thereof, of a series of radial ribs integral with the side of said utensil and having their upper ends secured to said annular flange forming pockets to retard the upward flow of heated air past the sides of the utensil.

5. In a device of the class described, the combination with a cooking utensil, of an annular flange formed on and projecting from the bottom thereof, a radial flange formed on the side of said utensil and a series of radial ribs formed on the sides of said utensil between said flanges and having their ends secured to said flanges to form heat retaining pockets.

WILLIAM P. GENOVAR, Jr.